(12) United States Patent
Blue et al.

(10) Patent No.: US 7,636,871 B1
(45) Date of Patent: Dec. 22, 2009

(54) METHOD FOR COMPARING CUSTOMER AND TEST LOAD DATA WITH COMPARATIVE FUNCTIONAL COVERAGE HOLE ANALYSIS

(75) Inventors: Dale E. Blue, Poughkeepsie, NY (US); Shmuel Ur, Shorashim (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/257,652

(22) Filed: Oct. 24, 2008

(51) Int. Cl.
*G06F 11/00* (2006.01)

(52) U.S. Cl. .............................. 714/32; 714/25; 714/33; 714/45; 716/1; 716/4; 703/13; 703/21

(58) Field of Classification Search .............. 714/32, 714/45, 25, 33; 716/1, 2, 4, 7; 703/13, 21
See application file for complete search history.

(56) References Cited

U.S. PATENT DOCUMENTS

| | | | |
|---|---|---|---|
| 6,553,514 B1 * | 4/2003 | Baumgartner et al. | 714/32 |
| 6,567,934 B1 * | 5/2003 | Yen et al. | 714/33 |
| 6,647,513 B1 * | 11/2003 | Hekmatpour | 714/37 |
| 6,708,143 B1 * | 3/2004 | Kurshan | 703/2 |
| 7,181,376 B2 * | 2/2007 | Fine et al. | 703/2 |
| 7,213,113 B2 * | 5/2007 | Sahin et al. | 711/162 |
| 7,389,215 B2 | 6/2008 | Azatchi et al. | |
| 7,428,715 B2 | 9/2008 | Fournier et al. | |
| 2006/0107158 A1 | 5/2006 | Mishra et al. | |
| 2006/0229860 A1 * | 10/2006 | Azatchi et al. | 703/14 |
| 2007/0168727 A1 * | 7/2007 | Fournier et al. | 714/25 |
| 2008/0184206 A1 | 7/2008 | Vikutan | |

OTHER PUBLICATIONS

Oded Lachish, "Hole Analysis for Functional Coverage Data," Proceedings of the 39th Conference on Design Automation, pp. 807-812, Jun. 10-14, 2002.

Audris Mockus, "Drivers for Customer Perceived Software Quality," 22nd International Conference on Software Engineering, pp. 225-233, ACM Press, St. Louis, Missouri (2005).

Matteo Golfarelli, "The Workload You Have, the Workload You Would Like," 6th ACM International Workshop on Data Warehousing and OLAP, pp. 79-85, Nov. 7, 2003.

Raanan Grinwald, "User Defined Coverage," Proceedings of the 35th Annual Conference on Design Automation, 6 pages, 1998.

(Continued)

*Primary Examiner*—Yolanda L Wilson
(74) *Attorney, Agent, or Firm*—Oppenheimer, Wolff & Donnelly LLP

(57) ABSTRACT

One aspect of the present invention includes performance of a comparative functional coverage technique for comparing analysis of actual operational load data, such as customer data, with test operational load data. In one embodiment, coverage and holes analysis operations are performed on each of actual trace data produced by the operation of actual activities, and test trace data produced by the operation of a simulation within a test execution. The functional coverage and hole analysis results produced for each of the actual data source and the test data source are then compared to discover the most important functional holes relevant to testing, namely holes which appear only in the test but not within the actual operation. The results of the holes comparison detailing which holes exist within the test are then presented and ultimately utilized to improve the test.

1 Claim, 7 Drawing Sheets

OTHER PUBLICATIONS

Coverage-Driven Functional Verification, Verisity Design, Inc.,10 pages, Sep. 2001, http://www.verisity.com/resources/whitepaper/coverage_driven.html.

Alon Gluska, "Coverage-Oriented Verification of Banias," Proceedings of the 40th Conference on Design Automation, pp. 280-285, ACM Press (2003).

Verisity, http://verisity.com/products/printer/specman.html, "Specman Elite," 2 pages, 2004.

IBM, http://www.alphaworks.ibm.com/tech/focus, "FoCuS," 2 pages, Apr. 26, 1999.

Hezi Azatchi, "Advanced Analysis Techniques for Cross-Product Coverage," 55 IEEE Transactions on Computers, pp. 1367-1379, 2005.

Marek Leszak, "A Case Study in Root Cause Defect Analysis," 22nd International Conference on Software Engineering, pp. 428-437, 2000.

* cited by examiner

| module | tread | COUNT |
|---|---|---|
| 10 | 0 | |
| 10 | 1 | 907 |
| 11 | 0 | |
| 11 | 1 | 907 |
| 13 | 0 | |
| 13 | 1 | 196 |
| 14 | 0 | |
| 14 | 1 | 362 |
| 15 | 0 | |
| 15 | 1 | 188 |
| 18 | 0 | |
| 18 | 1 | 397 |
| 19 | 1 | 25 |
| 19 | 0 | |
| 21 | 0 | |
| 21 | 1 | 397 |
| 23 | 0 | |
| 23 | 1 | 11177 |
| 25 | 0 | |
| 25 | 1 | 3561 |
| 27 | 0 | |
| 27 | 1 | 175 |
| 33 | 0 | |
| 33 | 1 | 16 |
| 4 | 0 | |
| 4 | 1 | 4067 |
| 41 | 0 | |
| 41 | 1 | 404 |
| 42 | 0 | |
| 42 | 1 | 514 |

Number of Tasks: 52   Covered: 27   Coverage Percentage: 51.9%

Click on a column header to sort the rows by this column

Help

| module | thread | Customer | Test |
|---|---|---|---|
| 10 | 0 | 0 | 2 |
| 19 | 0 | 25 | 0 |
| 23 | 0 | 0 | 3 |
| 68 | 0 | 30 | 0 |
| 10 | 1 | 907 | 1573 |
| 11 | 1 | 907 | 1574 |
| 13 | 1 | 196 | 185 |
| 14 | 1 | 362 | 254 |
| 15 | 1 | 100 | 170 |
| 18 | 1 | 397 | 774 |
| 21 | 1 | 397 | 774 |
| 23 | 1 | 11177 | 14569 |
| 25 | 1 | 3561 | 215 |
| 27 | 1 | 175 | 280 |
| 33 | 1 | 16 | 4 |
| 4 | 1 | 4067 | 3363 |
| 41 | 1 | 404 | 218 |
| 42 | 1 | 514 | 135 |
| 46 | 0 | 3218 | 2105 |
| 48 | 1 | 5 | 1258 |
| 49 | 1 | 361 | 320 |
| 51 | 1 | 1726 | 40 |
| 54 | 1 | 132 | 16 |
| 55 | 1 | 65 | 8 |
| 59 | 1 | 8 | 12 |

Summary: # Tasks: 52  # Changes: 29  Covered: 27 : 27  Coverage Percentage: 51.9%  : 51.9%

Click on a column header to sort the rows by this column

- 410 Coverage sort
- 420 Changed on bottom
- 440 Ratio: [1] / [2]
- 450
- 430

Buttons: Show subtasks info | Exclude | Save | Export

Fig. 5

| module | thread | Customer | Test |
|---|---|---|---|
| 68 | 0 | 30 | 0 |
| 19 | 0 | 25 | 0 |
| 51 | 1 | 1726 | 48 |
| 25 | 1 | 3561 | 215 |
| 54 | 1 | 132 | 116 |
| 55 | 1 | 65 | 8 |
| 33 | 1 | 16 | 4 |
| 42 | 1 | 514 | 135 |
| 41 | 1 | 404 | 218 |
| 46 | 0 | 3218 | 2105 |
| 14 | 1 | 062 | 254 |
| 7 | 1 | 575 | 413 |
| 80 | 1 | 378 | 279 |
| 4 | 1 | 4067 | 3363 |
| 49 | 1 | 361 | 320 |
| 15 | 1 | 188 | 170 |
| 13 | 1 | 186 | 185 |
| 6 | 1 | 3165 | 3080 |
| 11 | 0 | 0 | 0 |
| 13 | 0 | 0 | 0 |
| 14 | 0 | 0 | 0 |
| 15 | 0 | 0 | 0 |
| 18 | 0 | 0 | 0 |
| 19 | 1 | 0 | 0 |

Summary
Tasks: 52  # Changes: 29  Covered: 27 : 27  Coverage Percentage: 51.9%   : 51.9%

Click on a column header to sort the rows by this column

Coverage sort
Changed on top
Ratio: [2] / [1]

510
520

Show subtasks info | Exclude | Save | Export

METHOD FOR COMPARING CUSTOMER AND TEST LOAD DATA WITH COMPARATIVE FUNCTIONAL COVERAGE HOLE ANALYSIS

FIELD OF THE INVENTION

The present invention generally relates to data operations performed within a testing environment. The present invention more specifically relates to a comparison of actual operational load data with test operational load data using comparative functional coverage and functional coverage hole analysis operations.

BACKGROUND OF THE INVENTION

Emulating customer data for the purpose of data testing is a common practice. The idea is to create a load in test such that an operational test "profile" is similar to the profile of the actual customer data. The way that customer and test load data are typically compared is that many parameters are evaluated over both profiles and the differences are compared. However, as illustrated below, the establishment of an accurate operational test profile and an efficient comparison of the customer and test profiles are not easily accomplished by existing methods in the art.

Some test teams profile a customer's workload by generating a set of queries against existing system management data produced by the system to help determine the desired features for workload optimization. The idea is to create a load in test such that the operational profile is similar to that of the customer. A comparison is then performed, evaluating many parameters over both profiles and compiling the differences. However, because there are cases when thousands of parameters and attributes are compared, it is difficult to separate important data from unimportant data. In addition, these models are implementation-specific. This causes the coverage tooling, including data collection and data presentation, to be model-specific as well.

For example, using an IBM® System z test environment, test teams can employ a method known as workload profiling. This method retrieves empirical system data produced by the z/OS operating system and performs a logical and statistical comparison between data from the customer's environment and data from the test environment. This comparison shows gaps in stress levels against certain functions within the system and the overall system in general. It also shows configuration options chosen by customers and a certain amount of functional flow of control.

Another existing method to compare customer and test data is to perform a comparative functional coverage analysis, to see if the results are similar. Functional coverage is a coverage methodology which can evaluate the completeness of testing against application-specific coverage models. For example, the model could be to "check that every <unit> sends every possible <signal> to every other <unit>." However, these models may produce too much data to easily filter important data from unimportant data.

Techniques currently exist for condensing coverage data through the use of "hole analysis." Hole analysis enables the discovery and reporting of large uncovered spaces for cross-product functional coverage models. Thus, hole analysis techniques allow a coverage tool to provide shorter and more meaningful coverage reports to a user. Hole analysis techniques, however, have not been applied within test applications to produce comparisons between test and customer data, and similarly have not been applied within functional coverage tools.

What is needed in the art are enhanced operations for condensing coverage data, specifically customer data and test data used to simulate a customer profile. The present disclosure introduces such enhanced operations through the application of appropriate comparative functional coverage sort algorithms and comparative functional coverage hole analysis upon sets of actual data and test data.

BRIEF SUMMARY OF THE INVENTION

One aspect of the present invention includes an enhanced use of comparative functional coverage holes analysis. In one embodiment, the various forms of coverage holes analysis are performed on one source of data (usually test data), while checking each of the holes on the other source of data (usually customer data). A full report produced by the coverage holes analysis will illustrate holes divided into three categories: (1) holes on both sets of data, (2) holes on customer data (i.e., no matching holes in test data), (3) holes on test data (i.e., no matching holes in customer data).

The overall goal when using comparative functional coverage within the test phase is to match the customer's usage to data, rather than trying to ensure complete coverage. In particular, the category of holes on test data with no holes in customer data is useful for identifying and improving test data which is intended to fully simulate customer data. This point of view accordingly reduces the need for testing which performs complete functional coverage.

Therefore, the various implementations of the present invention include techniques and methodology with holes analysis to provide a better operation of comparative functional coverage for test data. With this new technique, test teams are able to further refine their test workloads, environments, and configurations. This enables test teams to examine specific IT environments and change their test approach to better align with the way products are actually used.

A further aspect of the present invention involves implementing enhanced analysis within a comparative functional coverage tool. With real data, a general functional coverage data exploration tool is capable of finding and highlighting trends and behaviors that distinguish the test data from the customer. By augmenting the functional coverage methodology for comparative functional coverage, the amount of work done to collect the data (instrumentation and special scripting) is reduced, and a true exploration of the data may be produced.

In one embodiment of the present invention, a method for comparing actual and test load data with comparative functional coverage hole analysis first comprises preparing a coverage model, including selecting an actual data source (such as from a customer) and a test data source. The actual data source is used for storing an actual profile (e.g., a customer profile), and the test data source is used for storing a test profile that is intended to simulate the actual profile as closely as possible. Next, actual trace data is collected from an operation of one or more activities, according to the parameters of the actual profile. Likewise, test trace data is collected from an execution of one or more tests intended to simulate the one or more actual activities, according to the parameters of the test profile.

A first functional coverage and hole analysis is then performed on the actual trace data to produce an actual data coverage and hole result. A second functional coverage and hole analysis is performed on the test trace data to produce a test data coverage and hole result. Once these analysis operations are complete, a functional coverage and holes comparison is performed between the actual data coverage and hole result and the test data coverage and hole result to identify holes existing within the test data but not the actual data source. Based on this coverage and holes comparison, a report is generated which details data that is present within the actual profile but not within the test profile. Accordingly, the information can be used to facilitate improvement of the test profile and the one or more tests, and subsequently remove holes within the test coverage.

BRIEF DESCRIPTION OF THE DRAWINGS

FIG. 3 illustrates an example of a coverage report for a single data source generated according to one embodiment of the present invention;

FIG. 4 illustrates an example display illustrating a comparison of customer data to test data on a functional coverage model in accordance with one embodiment of the present invention;

FIG. 5 illustrates an example display illustrating additional sort options for a comparison of customer data to test data on a functional coverage model in accordance with one embodiment of the present invention;

DETAILED DESCRIPTION OF THE INVENTION

One aspect of the present invention includes enhanced operations used for comparisons of test data. In order to reduce the amount of work done to collect data (e.g., instrumentation and special scripting) and to enable exploration of the data, the present disclosure explains a functional coverage methodology augmented for comparative functional coverage reports and functional coverage holes analysis. With the application of real data and enhanced capabilities to a general functional coverage data methodology, numerous trends and behaviors can be discovered to distinguish test data from the actual customer data.

Figure 1:
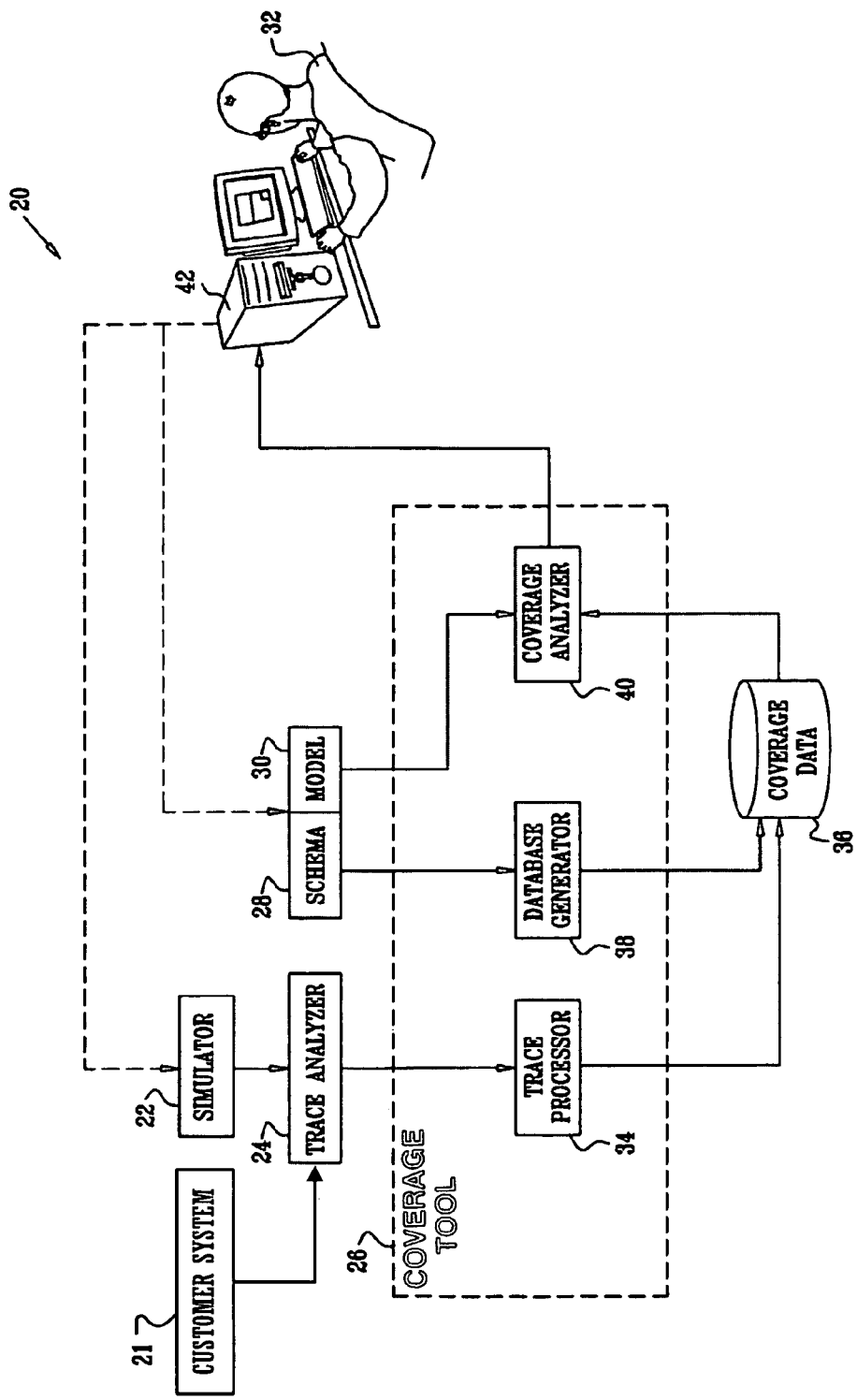
FIG. 1 is a block diagram of a system used for performing comparative functional coverage analysis in accordance with one embodiment of the present invention.

FIG. 1 depicts an operation 20 for performing analysis of input from a customer system 21 and a test (simulator) 22 in accordance with one embodiment of the present invention. A simulator 22 runs a suite of tests on a design under test, and a trace analyzer 24 generates trace data, containing lists of events that occurred during testing and within the customer system environment. (An "event" in this context is a particular combination of values of attributes of the design under test, which corresponds to a portion of the trace data produced by the trace analyzer 24) The trace data is processed by a coverage tool 26 in order to track the coverage between the testing program and the customer system. To process and display the coverage results, coverage tool 26 typically uses a schema 28 and a coverage model 30 that are provided by a user 32 of the tool. The schema is a list of attributes that defines the part of the design to be tested, and thus defines the area over which the coverage is to be measured by tool 26.

In this embodiment, coverage tool 26 comprises a trace processor 34, which arranges the coverage information from the trace files into a coverage database 36, which is held in a suitable memory. The organization of the database is determined by a database generator 38, on the basis of schema 28. As testing by simulator 22 progresses and data is processed from the customer system 21, trace analyzer 24 and trace processor 34 add data to coverage database 36, indicative of the events that have been covered. A coverage analyzer 40 processes the information in the coverage database and, on the basis of model 30, presents the coverage model on an output device 42, such as a terminal display or a printer. Based on this presentation, user 32 is able to identify holes in the coverage that has been achieved, as well as blocks of events that have been covered, at various points in the course of testing by simulator 22 and/or operation of the customer system 21. The user may then determine which holes exist between the test and customer data based on the results of the coverage model.

Figure 2:
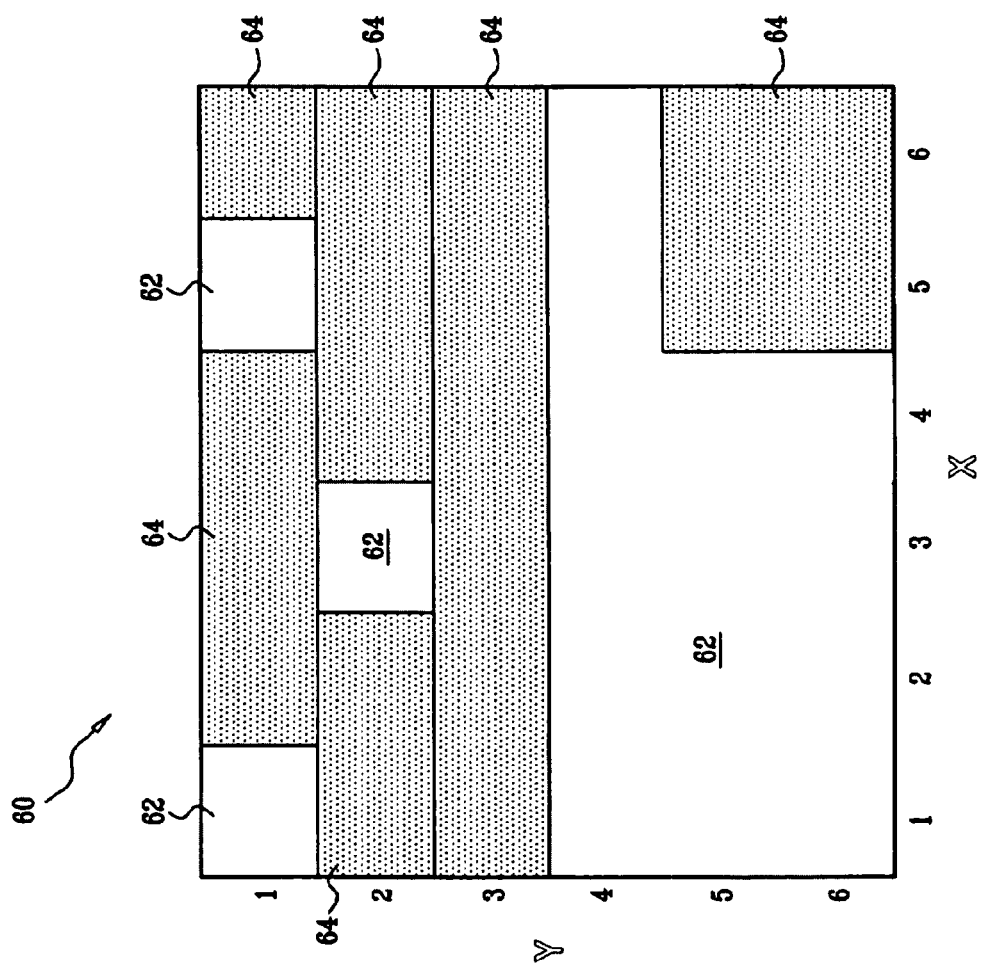
FIG. 2 is a schematic map of existing coverage holes revealed by function coverage holes analysis of a single trace in accordance with one embodiment of the present invention.

FIG. 2 depicts a schematic map of existing coverage holes revealed by function coverage holes analysis of a single trace in accordance with one embodiment of the present invention. The model is based on two attributes, arbitrarily referred to as X (on the horizontal axis) and Y (on the vertical axis), both having integer domains {1 . . . 6}. The simplified presentation of the coverage model 60 of FIG. 2 represents the result generated by the coverage analyzer in accordance with an embodiment of the present invention. In this embodiment, individual events are aggregated into the covered area 62. The remainder of the map provides a clear presentation of aggregated holes 64, representing the areas of the cross-product space that remain to be covered by further testing. For example, the user can clearly see in coverage model 60 that the attribute value Y=3 has not yet been tested at all.

In one embodiment of the present invention, a functional coverage tool is enhanced to perform a comparative functional coverage report. This involves running a functional coverage report once using test data and another time using actual data (such as customer data), and presenting a comparison of the two.

The idea of comparing two sets of data seems straightforward. Normally there is a coverage model and the traces are compared against the model. The coverage output is composed of a list of tasks, where each task has a description and an indication of how many times it has been covered. FIG. 3 illustrates an example of a coverage report for a single data source, generated according to one embodiment of the present invention. In this report, each task has two attributes: module 310 and thread 320. In the table, the row 330 represents a task with a value of 10 for the module attribute and 1 for the thread attribute, which was covered 907 times.

Being able to see results from two data sources requires a number of additional features related to appropriate sorting of the compared data. The addition of a second data source is illustrated in FIG. 4 according to one embodiment of the present invention. This figure depicts the same list of tasks with measurements from two data sources. The measured coverage of Customer data is under the Customer column 410 and the coverage of the Test data is presented under the Test column 420.

FIG. 4 depicts two specialized sort capabilities, within a "source1/source2" sort (Ratio [1]/[2] button 440), and a "changed" sort (Changed on bottom button 450). In this example the "changed" sort has been applied. Tasks with large changes are automatically placed at the top of the list. The top four rows 430 therefore show tasks covered by only one data source. For example, the first row shows a task that was covered only under the Test data source. This sorting capability is practical when the user is not particularly concerned about the order, as it enables the user to find out where one workload has concentration which the other lacks. This is very important for the exploration stage, and may be set as the default of the functional coverage tool. The sort is reversible using the Changed on bottom button 450 (and the Changed on top button 520 in FIG. 5).

The second sort is the source1/source2 sort (Ratio [1]/[2] button 440). FIG. 5 depicts this sort having been performed on the same data. The top of the screen shows all the tasks in which the Customer has better coverage than the Test. The bottom of the table (not visible) shows the complementary tasks which are covered better by the Test than by the Customer. Additionally, since the sort is reversible, the reverse sort may be implemented with a source2/source1 sort (initiated by the Ratio [2]/[1] 510 button as illustrated in FIG. 5).

Figure 6:
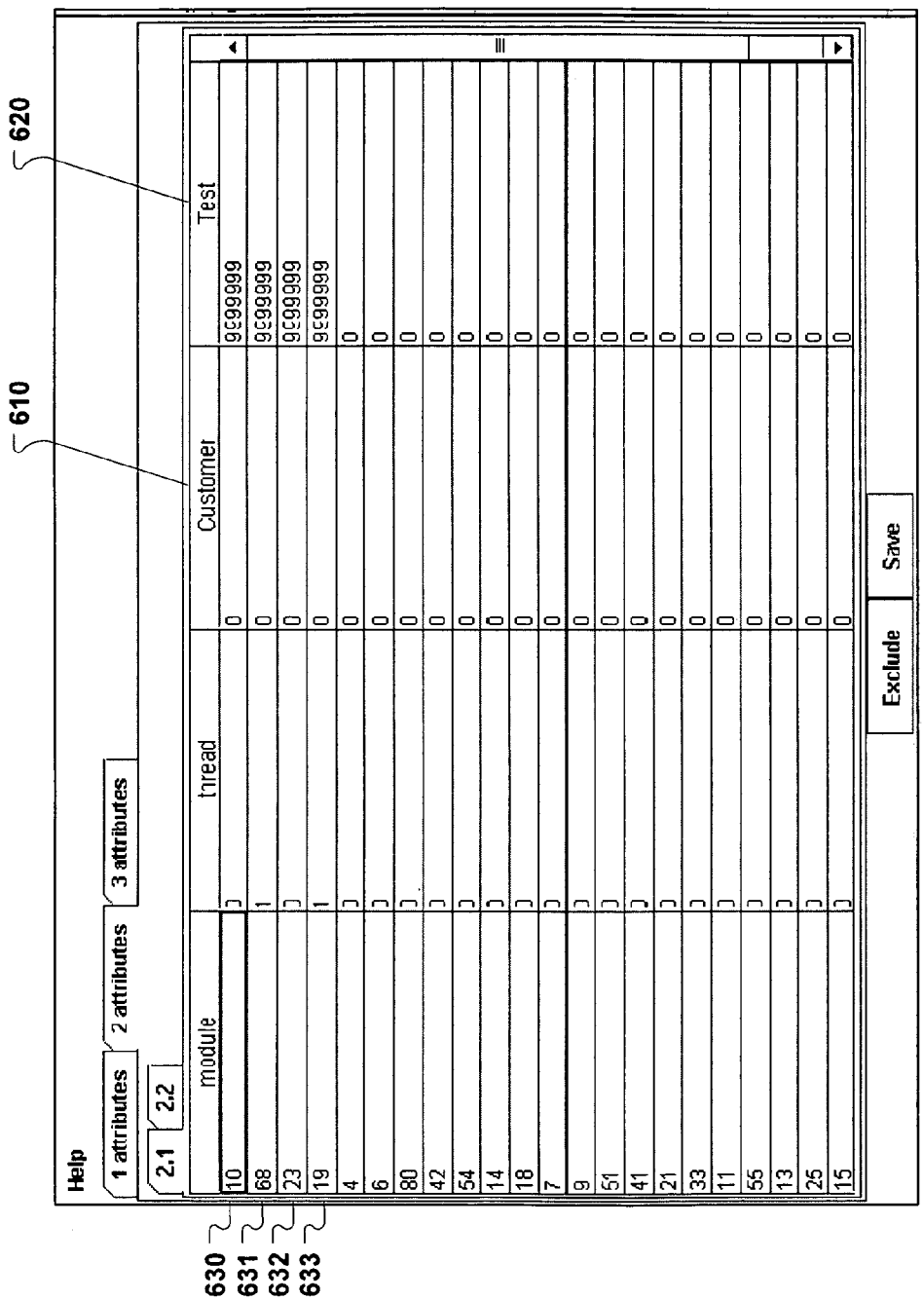
FIG. 6 illustrates an example display of subsets (holes) coverage results comparing customer data to test data in accordance with one embodiment of the present invention.

In a further embodiment of the present invention, the same coverage data can also be shown using another technique called a Subsets (holes) report. Coverage holes are defined as projections on subsets of variables that were not covered as illustrated in FIG. 2. This involves running a hole report once to determine the holes in test data, checking each hole against a different set of data (the customer data), and reporting which holes are in test but not at the customer. FIG. 6 illustrates an example of a comparison of customer data to test data with a subsets (holes) coverage result according to one embodiment of the present invention. As is depicted in FIG. 6, the measured coverage of Customer data is under the Customer column 610, and the coverage of the Test data is illustrated under the Test column 620. The first row 630 in the report shows that the partial task ("10", "0") represents a hole in the Customer data source but not in the Test data source (the "999999" value is an indicator for no hole). The partial tasks with a high absolute value of change between the sources are placed on the top. The top four rows 630, 631, 632, 633 further show partial tasks that exist only on the Customer data source.

Figure 7:
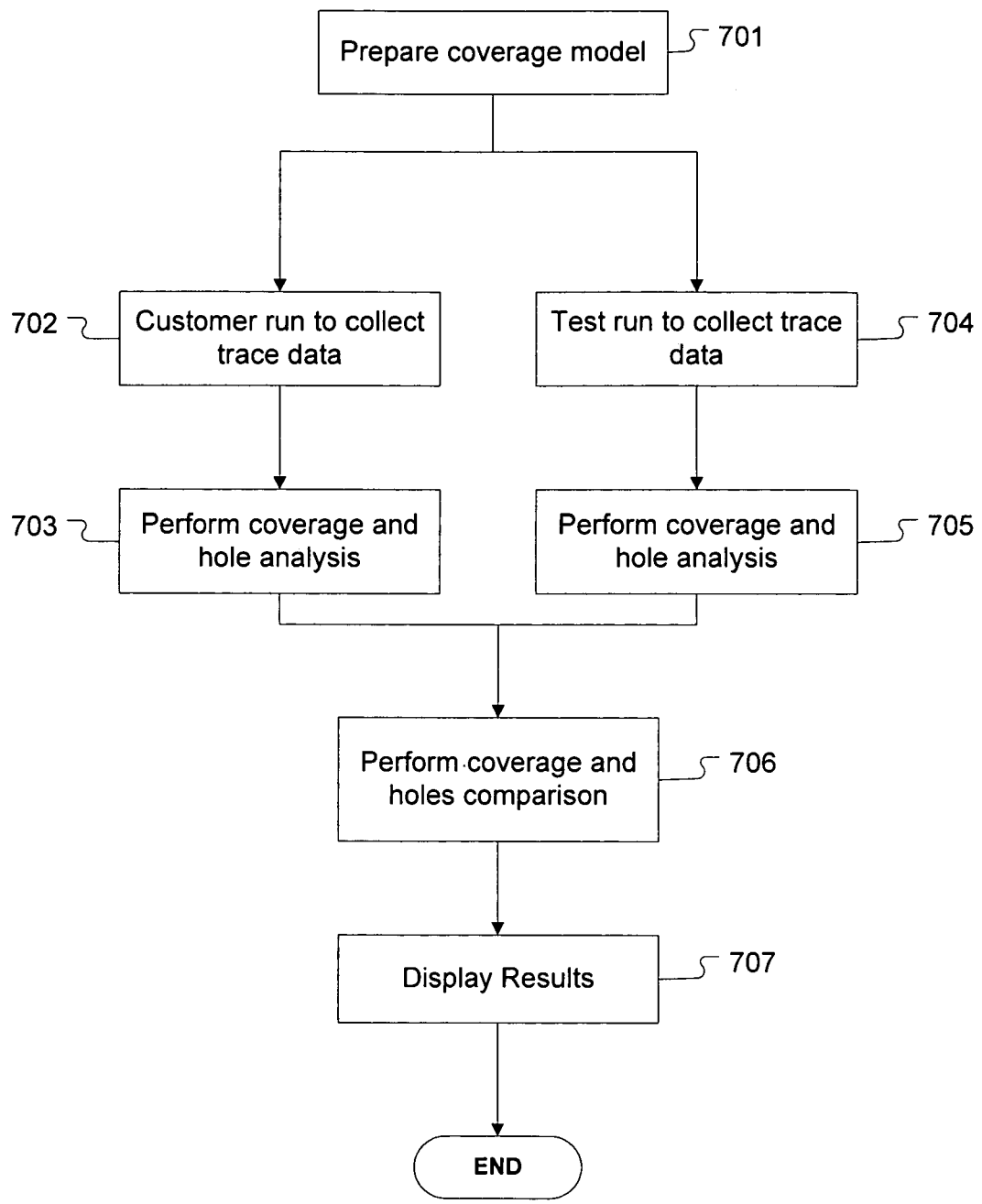
FIG. 7 illustrates a flowchart of an operation for comparing customer and test load data with comparative functional coverage holes in accordance with one embodiment of the present invention.

FIG. 7 depicts a flowchart illustrating an operation for comparing customer and test load data with comparative functional coverage and comparative functional coverage hole analysis in accordance with one embodiment of the present invention. First, as in step 701, the coverage model is prepared for a comparison of a test to a customer profile. This may include selecting a customer data source which already contains or produces customer operational load data, and selecting a test data source which contains or produces operational load data that is intended to simulate the customer operational load data.

Next, as in step 702, data operations within the customer are executed, and customer trace data is collected. Once the customer trace data is collected, coverage and hole analysis will be performed on the trace data as in step 703. The coverage and hole analysis involves discovering and reporting large non-covered spaces ("holes") in a cross-product model of the customer trace data domain.

Similarly, the test is executed, and test trace data is collected as in step 704. Coverage and hole analysis is then performed on the test trace data as in step 705. Again, the coverage and hole analysis involves discovering and reporting large non-covered spaces ("holes") in a cross-product model of the test trace data domain. Those skilled in the art will recognize that the coverage and hole analysis results may be produced for both customer trace data and test trace data, or may be produced for each type of data separately.

Based on the results that the coverage and hole analysis produces for the customer and test trace data, the elements in each of the two analysis reports are then categorized. As in step 706, this categorization involves performing both a coverage and holes comparison between the results for the customer and the results for the test. In the case of functional holes, performing a comparison between these two analysis results will result in three sets of holes: (1) holes appearing both in customer and test; (2) holes appearing only in customer; and (3) holes appearing only in test. Again, the most important set of holes are those appearing only in test, because it represents something the customer does that the test does not do.

Finally, the results of the coverage and holes comparison are presented to a user as in step 707. This may include displaying a functional coverage table report, and performing sort algorithms upon the displayed results (e.g., sorting by the relative coverage of Ratio (1)/(2), Ratio (2)/(1), or sorting by the absolute value of change within the report).

As one skilled in the art would recognize, the present disclosure of this methodology is not only applicable to functional coverage tools, but may also be incorporated within code coverage and additional testing tools. As will also be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, the present invention may take the form of a computer program product embodied in any tangible medium of expression having computer usable program code embodied in the medium.

The present invention has previously been described with reference to flowchart illustrations and block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for comparing actual and test load data with comparative functional coverage hole analysis, comprising:

selecting an actual data source and a test data source, the actual data source containing a first actual profile, and the test data source containing a second test profile intended to simulate the first actual profile;

collecting actual trace data from the actual data source with an operation of one or more activities according to the first actual profile;

collecting test trace data from the test data source from an execution of one or more tests according to the second test profile;

performing functional coverage and hole analysis on the actual trace data to produce an actual data coverage and hole result;

performing functional coverage and hole analysis on the test trace data to produce a test data coverage and hole result;

performing a functional coverage and holes comparison between the actual data coverage and hole result and the test data coverage and hole result to identify holes existing within the test data coverage and hole result but not the actual data coverage and hole result; and generating a report from the coverage and holes comparison detailing data that is present within the actual profile but not within the test profile to facilitate improvement of the test profile and the one or more tests.

* * * * *